Patented Aug. 7, 1928.

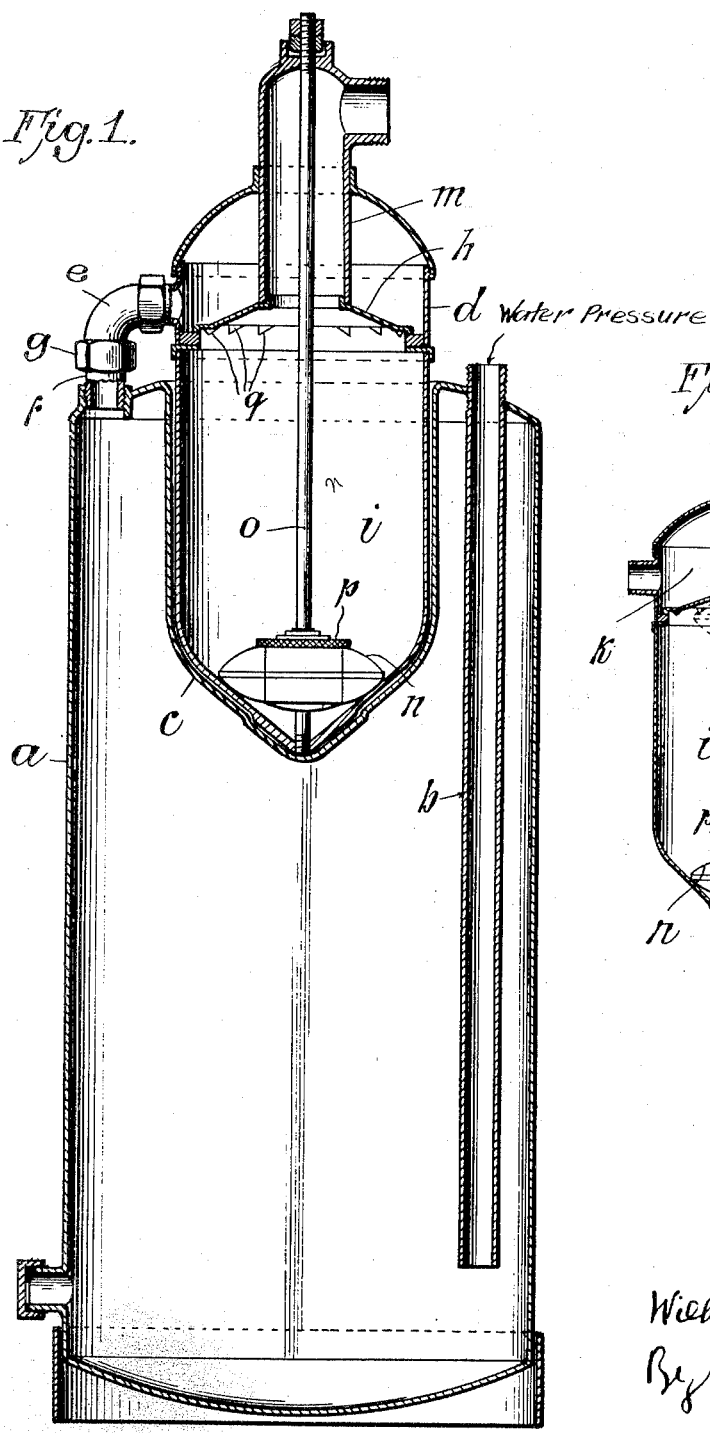
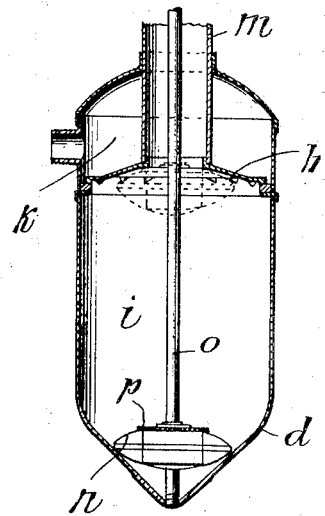

1,679,859

UNITED STATES PATENT OFFICE.

WILHELM GRAAFF, OF BERLIN, GERMANY, ASSIGNOR TO PYRENE-MINIMAX CORPORATION, A CORPORATION OF DELAWARE.

FOAM FIRE-EXTINGUISHING APPARATUS.

Application filed January 29, 1924, Serial No. 689,363, and in Germany January 29, 1923.

The invention relates to an apparatus for extinguishing fire by means of foam, in which the contents of a receptacle, which consists of the solution of a salt, for instance a carbonate, is forced into a second receptacle, which contains the reacting chemical and the foam generator. The displacement of the solution from the first receptacle is effected by water under pressure, which is introduced into the first receptacle from the top by a pipe which extends almost down to its bottom. This first receptacle or reservoir is provided at its top with a recess into which the second receptacle fits in such a manner that it may easily be lifted out. When the contents of the first receptacle is driven into the second receptacle foam is produced in the latter, and the foam is then forced through a wide central extension into a pipe leading to the fire. In order to prevent the discharge of pure water, which may cause damage, after the exhaustion of the chemicals producing the foam, a float is provided in the second receptacle in which the production of the foam takes place, which float rises in correspondence with the liquid collecting in the receptacle and closes the outlet when the foam is exhausted and only liquid remains in the receptacle. Thus no liquid can pass through the foam pipes. This float may also be employed when the contents of the first receptacle is forced into the second receptacle by a gaseous pressure medium. It will be understood that the utility of the float is by no means limited to apparatus in which the second receptacle is inserted in the first.

The accompanying drawing illustrates an embodiment of the invention.

Fig. 1 is a vertical section through a foam producing apparatus and

Fig. 2 is a vertical section on a smaller scale through the enclosed or second receptacle.

Referring to the drawings $a$ is a receptacle for a solution of carbonate or the like. Inserted into this receptacle $a$ from the top is the tube $b$, which extends almost to the bottom of the receptacle and serves for the supply of water under pressure. The top of the receptacle $a$ is provided with a recess $c$ for the reception of the receptacle $d$. For conveying the liquid in the receptacle $a$ into the receptacle $d$ an elbow $e$ is made use of which is connected with the outlet branch $f$ of the receptacle $a$ by means of a cap nut $g$ or the like, so as to be easily detachable. The receptacle $d$ is divided into two compartments $i$ and $k$ by a perforated partition $h$. The compartment $i$ contains the reacting chemical, for instance oxalic acid, for the chemical dissolved in the receptacle $a$, in the form of a powder and also the foam generator, for instance saponin, also in form of a powder. From the top of the compartment $i$ extends a wide tube $m$ with which is connected a hose or rigid pipe, not shown in the drawing, which conducts the foam to the fire.

Within the compartment $i$ a float $n$ is guided along a central rod $o$. This float rests upon the bottom of the compartment $i$ as long as the apparatus is not working and is embedded in the powdered chemicals contained therein. The specific gravity of the float is so calculated that it will float on the solution or on water but will not float on the foam produced in the second receptacle. When water under pressure enters the receptacle $a$ through the pipe $b$ it drives said solution in the receptacle before it through the outlet $f$ and the elbow $e$, into the chamber $k$ of the receptacle $d$. From here the solution passes through the perforations $q$ in the partition $h$ into the compartment $i$ and there enters into reaction with the powdered chemicals, so that foam is generated, which is conducted out of the apparatus through the central tube $m$. In correspondence with the collection of liquid in the compartment $i$ the float $n$ rises. When the compartment is entirely filled with liquid, the float assumes the position shown in Fig. 2 in broken lines, in which it closes the outlet of the tube $m$, so that no liquid can enter the latter or the foam pipe. In order to effect the tight sealing of the tube $m$, the float $n$ may preferably be provided on its top with a suitable packing $p$ either in the form of a ring or a disc.

What I claim as my invention and desire to secure by Letters Patent is:—

In a foam fire extinguisher the combination of a receptacle containing a salt solution, a pipe for the admission of water under pressure extending from the top to near the bottom of said receptacle, a recess in the top of said receptacle, a second receptacle adapted to be inserted in said recess, an elbow pipe connecting the top of said first receptacle with the top of said second receptacle, a perforated partition in said second receptacle adapted to divide said second receptacle into two compartments the lower of which contains a reacting chemical and a foam generator, a central vertical extension from said partition, a central rod extending from the bottom of said second receptacle to the top of said extension, a float within said lower compartment and adapted to ascend along said rod and to seal the entrance to said extension, and an outlet pipe upon said extension.

In testimony whereof I affix my signature.

WILHELM GRAAFF.